(12) United States Patent
Grgic

(10) Patent No.: US 7,778,713 B2
(45) Date of Patent: Aug. 17, 2010

(54) CONSTRUCTION OF AN INDUSTRIAL CONTROL SYSTEM USING MULTIPLE INSTANCES OF INDUSTRIAL CONTROL ENGINES

(75) Inventor: Richard J. Grgic, Painsville, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 498 days.

(21) Appl. No.: 11/679,380

(22) Filed: Feb. 27, 2007

(65) Prior Publication Data

US 2008/0208368 A1 Aug. 28, 2008

(51) Int. Cl.
*G05B 11/01* (2006.01)
(52) U.S. Cl. ...................................... 700/19
(58) Field of Classification Search ................ 700/19, 700/20, 31; 717/136, 151, 168; 718/105
See application file for complete search history.

(56) References Cited

U.S. PATENT DOCUMENTS

| | | | |
|---|---|---|---|
| 5,142,469 A | 8/1992 | Weisenborn | |
| 5,796,603 A * | 8/1998 | Hodorowski | 700/2 |
| 5,826,244 A | 10/1998 | Huberman | |
| 5,875,461 A | 2/1999 | Lindholm | |
| 5,887,029 A | 3/1999 | Husted et al. | |
| 5,949,674 A | 9/1999 | Song et al. | |
| 5,970,243 A | 10/1999 | Klein | |
| 5,971,581 A | 10/1999 | Gretta et al. | |
| 6,055,370 A | 4/2000 | Brown et al. | |
| 6,268,853 B1 | 7/2001 | Hoskins et al. | |
| 6,338,130 B1 | 1/2002 | Sinibaldi | |
| 6,373,836 B1 | 4/2002 | Deryugin et al. | |
| 6,453,460 B1 | 9/2002 | Keyes | |
| 6,615,092 B2 | 9/2003 | Bickley et al. | |
| 6,735,764 B2 | 5/2004 | Nakai | |
| 6,816,746 B2 | 11/2004 | Bickley et al. | |
| 6,901,446 B2 | 5/2005 | Chellis et al. | |
| 6,922,681 B2 | 7/2005 | Fromherz et al. | |
| 6,947,798 B2 | 9/2005 | Bronikowski et al. | |
| 7,039,740 B2 | 5/2006 | Glasco et al. | |
| 7,065,714 B1 | 6/2006 | Theel et al. | |
| 7,139,618 B2 | 11/2006 | Danz et al. | |
| 7,257,620 B2 | 8/2007 | Lo | |
| 7,272,815 B1 | 9/2007 | Eldridge et al. | |
| 7,374,524 B2 | 5/2008 | McCormick | |
| 7,472,387 B2 | 12/2008 | Nakano | |

(Continued)

OTHER PUBLICATIONS

Foley, M.; "Modify MicroLogix online"; Feb. 2006; A-B Journal, vol. 13, No. 1; abstract; pp. 1-2.*

(Continued)

*Primary Examiner*—Albert DeCady
*Assistant Examiner*—Chad Rapp
(74) *Attorney, Agent, or Firm*—Turocy & Watson LLP; R. Scott Speroff; John M. Miller

(57) ABSTRACT

The claimed subject matter provides a system and/or method that facilitates optimizing a controller within an industrial automation environment. A controller can be associated with an industrial automation environment. Two or more controller engine instances can execute on the controller to enable dynamic control related to at least one of a device or a portion of a process within the industrial automation environment.

30 Claims, 12 Drawing Sheets

U.S. PATENT DOCUMENTS

| | | |
|---|---|---|
| 2002/0129085 A1 | 9/2002 | Kubala et al. |
| 2002/0194417 A1 | 12/2002 | Suzuki et al. |
| 2003/0163508 A1 | 8/2003 | Goodman |
| 2004/0117535 A1 | 6/2004 | Schaftlein |
| 2005/0024102 A1 | 2/2005 | Kondo |
| 2005/0028137 A1 | 2/2005 | Evans et al. |
| 2005/0202808 A1 | 9/2005 | Fishman et al. |
| 2006/0005171 A1 | 1/2006 | Ellison |
| 2006/0041328 A1 | 2/2006 | McCormick |
| 2006/0092861 A1 | 5/2006 | Corday et al. |
| 2006/0150174 A1 | 7/2006 | Abe et al. |
| 2006/0178757 A1 | 8/2006 | Grgic et al. |
| 2007/0044066 A1 | 2/2007 | Meijer et al. |
| 2007/0173959 A1 | 7/2007 | Chandhoke |
| 2008/0066019 A1 | 3/2008 | Worek et al. |
| 2008/0090586 A1 | 4/2008 | Engelhart |
| 2008/0109471 A1 | 5/2008 | Subbian et al. |
| 2008/0125877 A1 | 5/2008 | Miller et al. |

OTHER PUBLICATIONS

OA mailed Feb. 25, 2009 for U.S. Appl. No. 11/686,406, 29 pages.
OA mailed Mar. 20, 2009 for U.S. Appl. No. 11/679,394, 37 pages.
OA mailed Mar. 9, 2009 for U.S. Appl. No. 11/695,758, 33 pages.
OA mailed Mar. 19, 2009 for U.S. Appl. No. 11/733,357, 34 pages.
OA dated Apr. 1, 2009 for U.S. Appl. No. 11/738,787, 32 pages.
OA dated Mar. 20, 2009 for U.S. Appl. No. 11/733,390, 35 pages.
OA dated Oct. 16, 2009 for U.S. Appl. No. 11/733,390, 41 pages.
OA dated Aug. 20, 2009 for U.S. Appl. No. 11/686,406, 31 pages.
OA dated Oct. 19, 2009 for U.S. Appl. No. 11/695,758, 32 pages.
OA dated Aug. 18, 2009 for U.S. Appl. No. 11/738,784, 38 pages.
OA dated Oct. 2, 2009 for U.S. Appl. No. 11/738,787, 22 pages.
OA dated Oct. 19, 2009 for U.S. Appl. No. 11/733,357, 38 pages.
Johnson, et al. "OS Partitioning for Embedded Systems" Feb. 2, 2006; QNX Software Systems, pp. 1-9.
Johnson. Lowering the Development Costs of Industrial Control Systems through Software Partitioning. Aug. 15, 2006; QNX Software Systems, pp. 1-9.
OA dated Feb. 22, 2010 for U.S. Appl. No. 11/738,787, 35 pages.
OA dated Feb. 23, 2010 for U.S. Appl No. 11/738,784, 35 pages.
OA dated Apr. 14, 2010 for U.S. Appl. No. 11/733,390, 67 pages.

* cited by examiner

CONSTRUCTION OF AN INDUSTRIAL CONTROL SYSTEM USING MULTIPLE INSTANCES OF INDUSTRIAL CONTROL ENGINES

TECHNICAL FIELD

The claimed subject matter relates generally to hardware controllers within an industrial automation environment and, more particularly, to optimize the execution of such hardware controllers.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers have been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with source and/or destination. More particularly, industrial controllers include communications ports and/or adaptors, and sensors, actuators, drives, and the like are communicatively coupled to such ports/adaptors. Thus, a controller can recognize device identity when data is received and further deliver control data to an appropriate device.

Unfortunately, traditional controllers employed within automation industrial environments have fallen behind recent technological advances to which the automation industry has maintained stride for stride. Conventional controllers are rigid and inflexible such that hardware and/or software associated therewith must be specifically tailored to a particular control engine. Moreover, in relation to industrial automation environments, controllers and control engines have a one-to-one ratio, wherein one control engine is executed per physical hardware platform (e.g., controller). With such one-to-one ratio, optimizing controllers to utilize full potential in a dynamic manner is virtually impossible. Moreover, in order to increase the efficiency in light of the constraints associated with conventional techniques described above, an increase in the amount of controllers is required which can be costly, inefficient, counter-productive, and meticulous.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems and/or methods that facilitate employing one or more controller engine instances related to a controller. A controller within an industrial automation environment can include a plurality of controller engine instances that execute thereon. In particular, the controller with a real time operating system (OS) can host most any suitable number of controller engine instance, wherein the controller engine instances can handle/control/manage at least a portion of a load related to the controller. Moreover, based at least in part upon the distribution of control to a plurality of controller engine instances, each controller engine instance can control/manage/handle at least one of a device, a portion of a device, or a portion of a process associated with the industrial automation environment. Allowing multiple instances of industrial control engines (e.g., controller engine instance) to execute on a single control platform (e.g., a controller) enables optimization of controllers rather than being restrained to conventional one-to-one ratios (e.g., one controller engine executing on one controller). Moreover, the creation of a new instance of an engine can be based on a set of pre-defined parameters, wherein no user intervention is needed to start the new instance of the engine.

In another aspect in accordance with the subject innovation, a plurality of controllers can be employed to share and/or host at least one controller engine instance. In other words, a distributed controller engine instance can be shared between more than one controller. Furthermore, the controller engine instance can be transferred and/or handed-off from an initial host/controller to a disparate host/controller. For instance, the transfer of the controller engine instances can be based on the deterioration of the health related to a particular controller/host.

In another aspect in accordance with the claimed subject matter, a manager component can be utilized to evaluate the industrial automation environment to ascertain a number of controller engine instances to generate/create. Moreover, the manager component can provide assignments for the generated controller engine instances. Generally, the manager component can enable dynamic adjustments in relation to at least one of a controller or a controller engine instance executing on such controller. In other aspects of the claimed subject matter, methods are provided that facilitates implementing one or more controllers that execute at least one controller instance distributed therewith.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such

DETAILED DESCRIPTION

Figure 1:
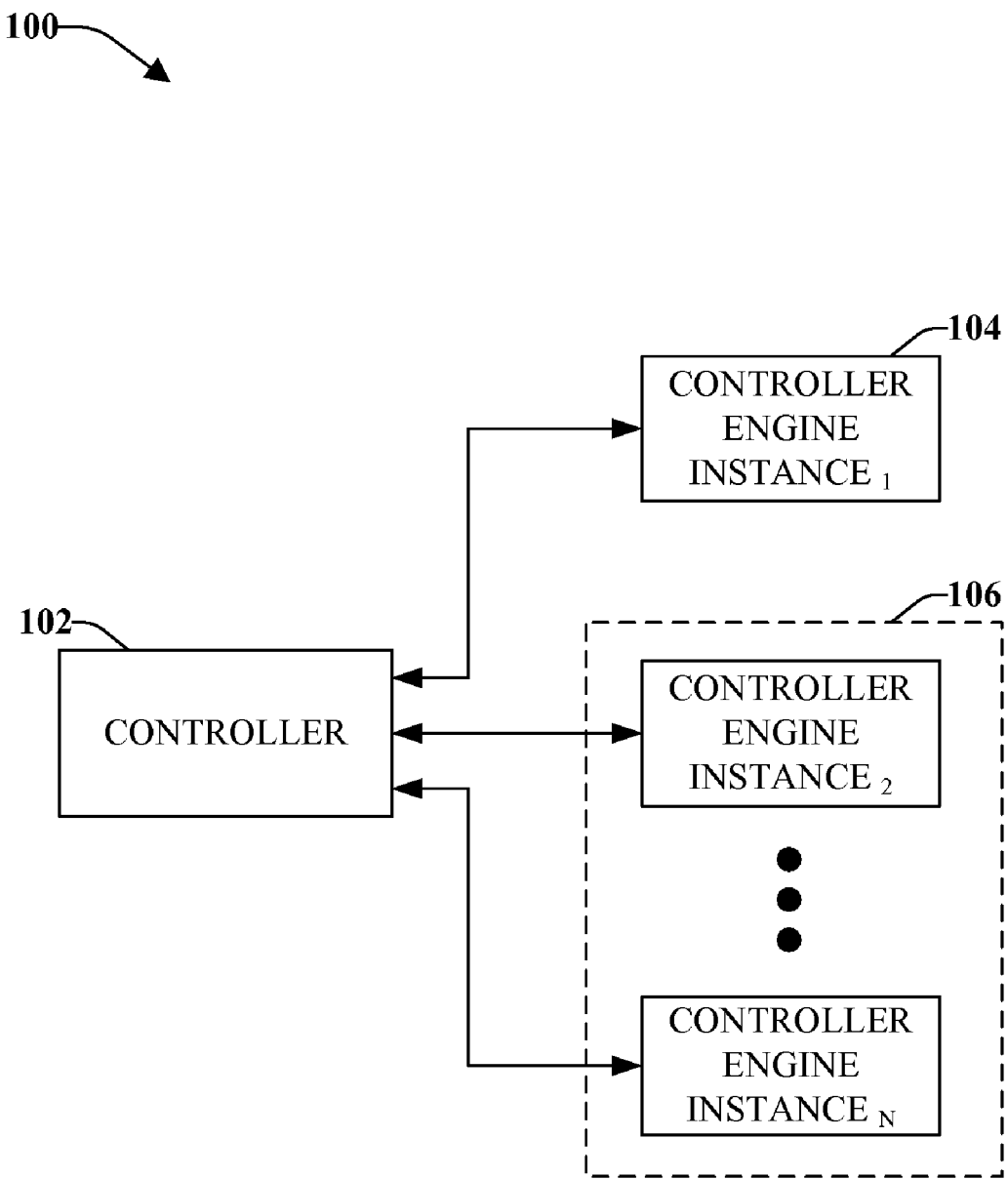
FIG. 1 illustrates a block diagram of an exemplary system that facilitates employing one or more controller engine instances related to a controller.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component," "controller," and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates a system 100 that facilitates employing one or more controller engine instances related to a controller. The system 100 can include a controller 102 that can generate at least one controller engine instance 104, wherein the controller engine instance 104 can execute on the controller 102 with a real time operating system (OS) to be utilized with automating/controlling an industrial manufacturing device and/or process. The controller 102 can utilize most any suitable number of controller engine instances 106 such as controller engine instance 1, controller engine instance 2, to controller engine instance N, where N is a positive integer. In other words, the controller 102 can implement a plurality of controller engine instances (e.g., controller engine instance 104), wherein each controller engine instance can handle controlling a device and/or portion of a process within an industrial automation environment. It is to be appreciated that the system 100 can enable the creation of a new instance of an engine based on a set of pre-defined parameters. In other words, no user intervention is needed to start a new instance of the engine.

For example, an industrial automation environment can include a controller that can be utilized with a first process, a second process, and a device. Conventionally, a controller and a controller engine are restricted to a one-to-one ratio such that there is only one controller engine per physical hardware controller. With such restrictions, additional hardware controllers needed to be introduced to enable multiple controller engines. However, the claimed subject matter implements a controller engine in a substantially similar manner to a process implemented on a hardware controller in the fact that multiple controller engines (e.g., controller engine instance) can execute on the hardware controller (e.g., multiple processes can execute on a controller). By executing multiple controller engine instances on the controller, each particular controller engine instance can handle at least a portion of a process and/or a device within the industrial automation environment. For instance, the controller can employ a controller engine instance to handle the first process, a controller engine instance to control the second process, and/or a controller engine instance to handle/control the device. It is to be appreciated that the controller can implement most any suitable number of controller engine instances. In another example, a first controller engine instance can be utilized for the first process and the second process while a disparate controller engine instance can be utilized for the device. In other words, the various number of controller engine instance can be managed to control, handle, and/or execute a device and/or process in most any suitable combination.

It is to be appreciated that the controller 102 can contain software components and hardware components having inputs and/or outputs that can be utilized in connection with automating an industrial manufacturing device/process. Moreover, it is to be appreciated and understood that the controller 102 can be most any suitable portion of hardware and/or portion of software that receives and/or transmits inputs and/or outputs in order to control at least one of a device or a portion of a process. It is to be noted that a controller (e.g., a programmable logic controller (PLC), etc.) can be a dedicated piece of hardware that is self contained or in the case of a "soft PLC" a piece of software that runs on a computer and provides PLC-like control. For instance, in the case of a soft PLC, the soft PLC can be partitioned to employ most any suitable soft PLC engine instances on a real time operating system (e.g., rather than a soft PLC controller executing on an operating system as non-real time), wherein each soft PLC engine instance can handle a portion of what the soft PLC engine handled, controlled, etc.

It is to be noted that the controller 102 can include various computer or network components such as servers, clients, communications modules, mobile computers, wireless components, control components and so forth that are capable of interacting across a network (not shown). Similarly, the term PLC or controller as used herein can include functionality that can be shared across multiple components, systems, and or networks. For example, one or more controllers 102 (e.g., PLCs, etc.) can communicate and cooperate with various network devices across a network. This can include substantially any type of control, communications module, computer, I/O device, sensor, Human Machine Interface (HMI)) that communicate via a network which includes control, automation, and/or public networks. The controller 102 can also communicate to and control various other devices such as Input/Output modules including Analog, Digital, Programmed/Intelligent I/O modules, other programmable controllers, communications modules, sensors, output devices, and the like.

A network can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (e.g., hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

In another aspect in accordance with the subject innovation, the controller can be implemented in the industrial automation environment (e.g., an industrial environment, an automation environment, an environment, an automation industry, etc.) which employs a hierarchical representation of devices and/or processes. The hierarchy can be based at least in part upon the physical location of devices/processes (e.g., a region of a factory can have several defined sub-regions, which in turn can comprise sub-regions), standards associated with industry, such as ISA, S95, ISA S88, and the like, proprietary hierarchy that is provided by an enterprise, or any other suitable hierarchy (discussed in further detail in FIG. 10).

Figure 2:
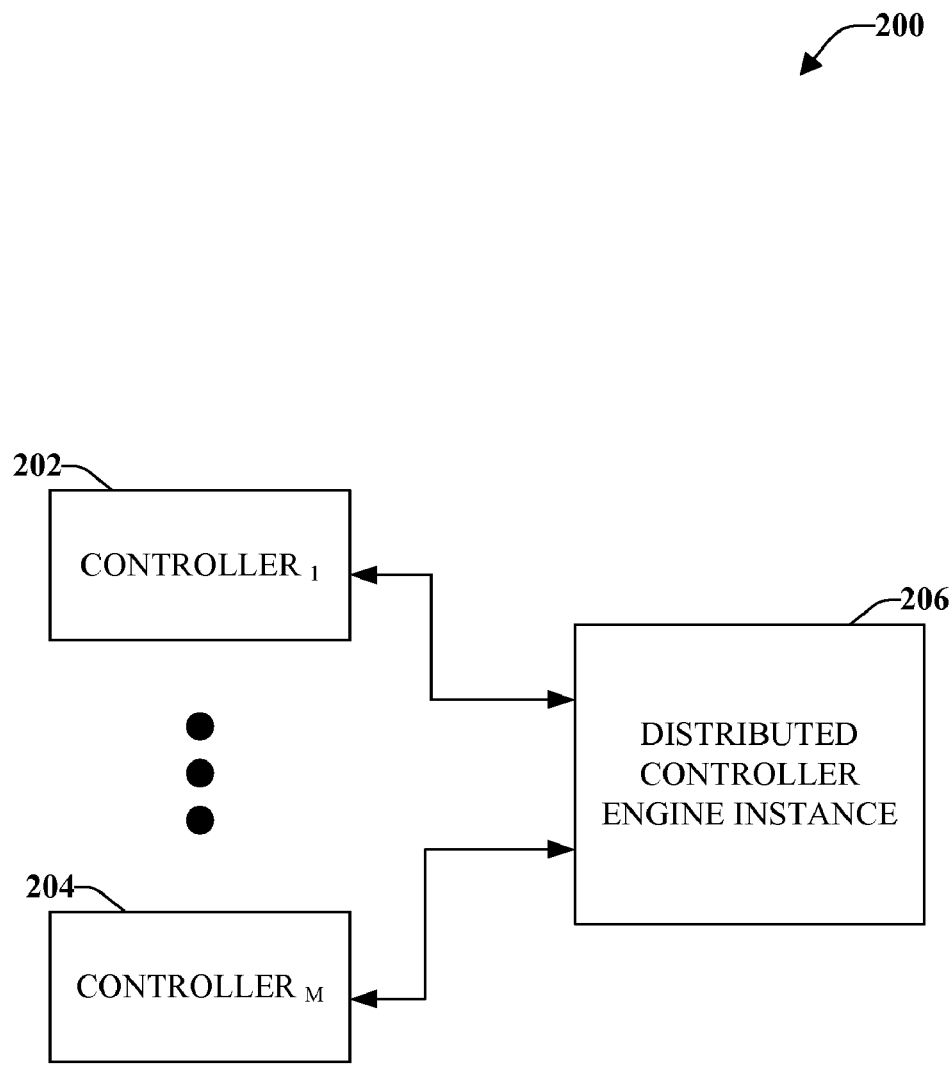
FIG. 2 illustrates a block diagram of an exemplary system that facilitates implementing one or more controllers that execute at least one controller instance distributed therewith.

FIG. 2 illustrates a system 200 that facilitates implementing one or more controllers that execute at least one controller instance distributed therewith. The system 200 can include a plurality of controllers such as controller $_1$ 202 to controller $_M$ 204 (collectively referred to as "controllers"), where M is a positive integer. The controllers can utilize at least one controller engine instance (not shown) executed thereupon. In particular, it is to be appreciated that each controller can include a real time operating system (OS) that can execute/host respective controller engine instances such that each controller engine instance executes on its corresponding controller. Moreover, the controllers can share and/or distribute hosting for a controller engine instance. As depicted in FIG. 2, a distributed controller engine instance 206 can be shared and/or distributed to one or more controllers. In other words, the distributed controller engine instance 206 can be executed on at least one of a portion of a first controller and a portion of a second controller, where there can be most any suitable number of controllers.

For example, an industrial automation environment can include controller A, controller B, and controller C. In one scenario, each controller engine instance can execute on a corresponding controller (as described in FIG. 1). However, there can be distributed controller engine instances (e.g., distributed controller engine instance 206) such that more than one controller can handle and/or host a controller engine instance. By sharing and/or distributing the execution of the controller engine instance to more than one controller, the full potential of controllers and respective controller engine instances can be reached.

In another example, a controller engine instance executing on a first controller can be seamlessly handed off to a disparate controller based upon a deterioration of the initial hosting controller (e.g., first controller). Furthermore, the controller engine instance can be shared and/or distributed to a disparate controller in light of a possible deterioration and/or problematic initial host controller. It is to be appreciated that the claimed subject matter is to include transferring, handing off, sharing, etc. of a controller engine instance to a disparate controller based on a particular event/circumstance (e.g., controller health, controller characteristic, restructure, update, security, upgrade, error, firmware, dependability, detail related to an industrial automation environment, etc.). It is to be appreciated that the system 200 can enable the creation of controller engine instances without user intervention. Thus, the creation and/or generation of the controller engine instances to execute on the real time operating system (OS) corresponding to the controller can be automatic and seamless.

Figure 3:
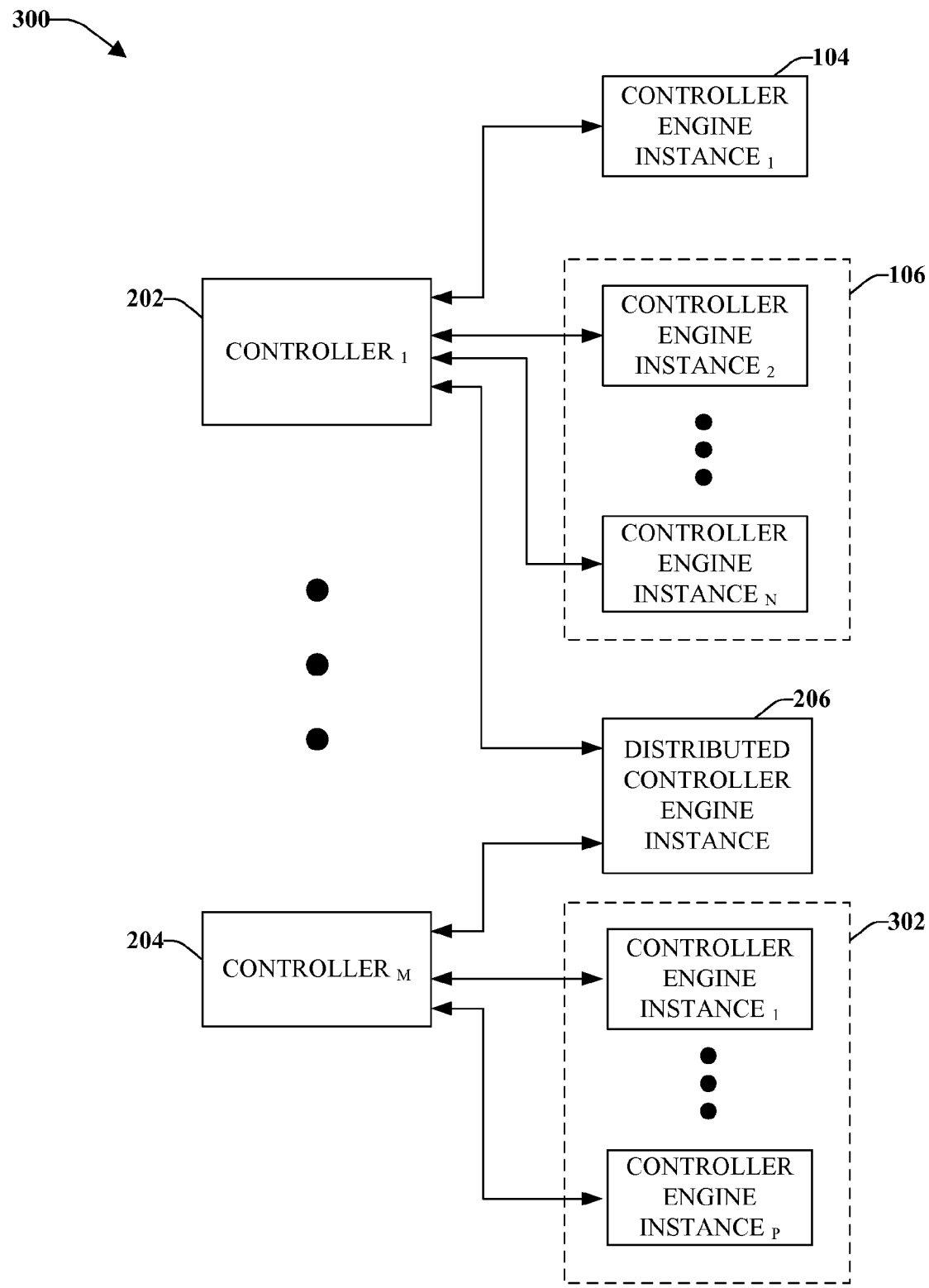
FIG. 3 illustrates a block diagram of an exemplary system that facilitates dynamically utilizing a plurality of controller engine instances related to a plurality of controllers.

FIG. 3 illustrates a system 300 that facilitates dynamically utilizing a plurality of controller engine instances related to a plurality of controllers. The system 300 can include most any suitable number of controllers such as controller $_1$ 202 to controller $_M$ 204, where M is a positive integer. Each controller can utilize respective controller engine instances that execute thereupon, wherein each controller engine instance can handle a portion of a load related to the host controller (e.g., the controller the controller engine instance is executing on). For example, the controller 202 can host the controller engine instance $_1$ 104 and/or the plurality of controller engine instances 106 (e.g., such as controller engine instance $_1$ to controller engine instance $_N$, where N is a positive integer).

Similarly, the controller $_M$ 204 can employ/utilize/host one or more controller engine instances 302 such as controller engine instance $_1$ to controller engine instance $_P$, where P is a positive integer. Still further, it is to be appreciated that the controller $_1$ 202 and the controller $_M$ 204 can utilize the distributed controller engine instance 206, wherein the distributed controller engine instance 206 executes on at least a portion of the controller $_1$ 202 or a portion of the controller $_M$ 204. Although a single distributed controller engine instance 206 is illustrated, it is to be understood that there can be most any suitable number of controller engine instances distributed to most any suitable number of controllers within an industrial automation environment.

Figure 4:
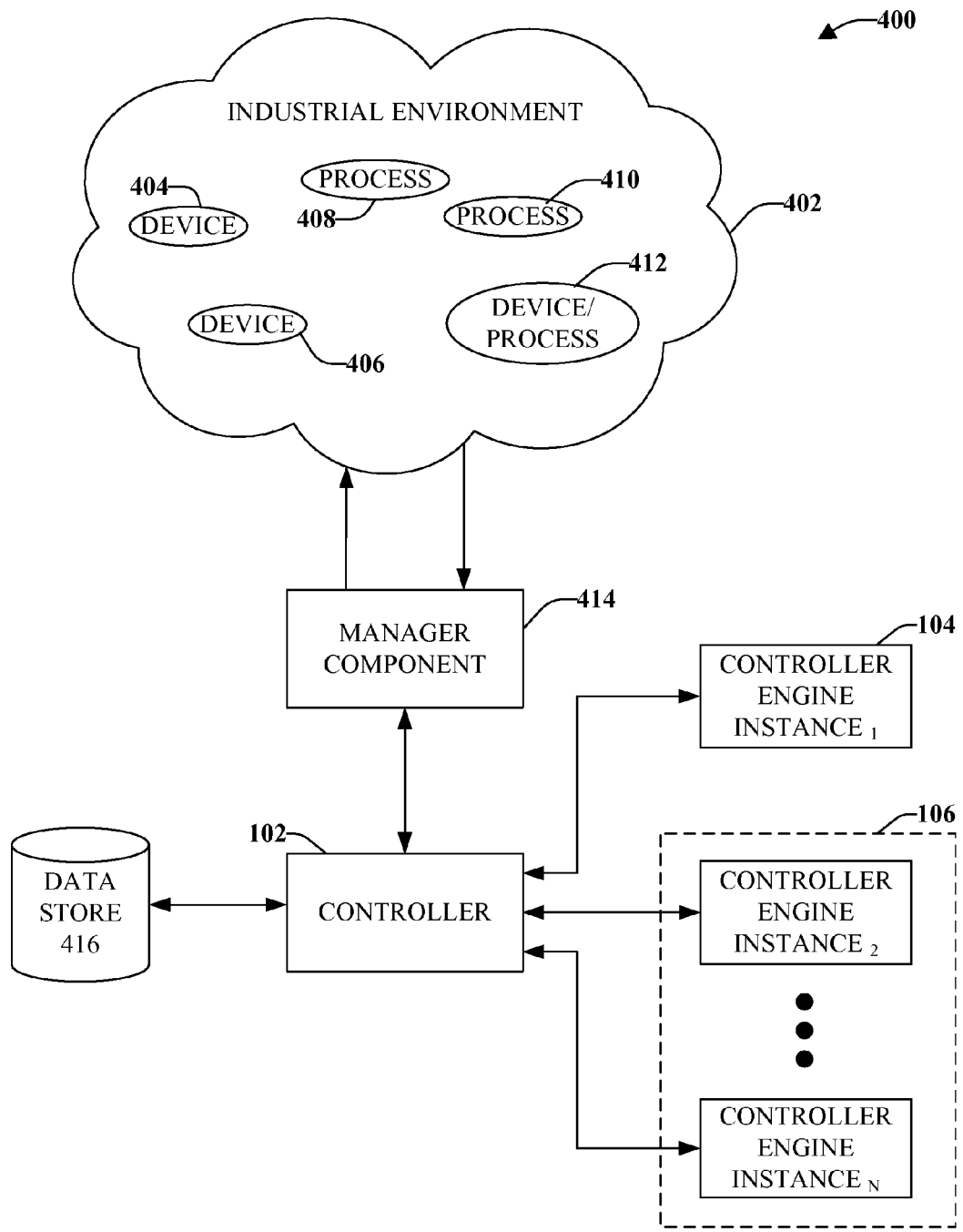
FIG. 4 illustrates a block diagram of an exemplary system that facilitates generating one or more controller engine instance related to a controller to enable optimization of an industrial environment.

FIG. 4 illustrates a system 400 that facilitates generating one or more controller engine instances related to a controller which enables optimization of control within an industrial environment. The system 400 can automatically and dynamically implement multiple controller engine instances 106 on the controller 102 in order to optimize performance and/or maximize potential of such hardware with at least one device and/or process within an industrial environment 402. For example, the industrial environment 402 can include most any suitable number of devices and/or process such as device 404, device 406, process 408, process 410, and/or device/process 412. It is to be appreciated that the devices and/or process within the industrial environment can be communicatively coupled to the system 400 by way of an intranet or other suitable network. The device can be most any suitable device associated with an industrial automation environment such as, but not limited to, a physical device, a software device, an application, a virtual device, a PLC, a controller device, a furnace, a human machine interface (HMI), a computer, a disparate controller, a roller, a station, a welder, a scanner, a belt conveyor, a pump, a press, a fan, a heater, a switch, a sensor, a conveyor, a portion of firmware, a portion of an application, a portion of a process, a cooler, a valve, an electrical component, a drain, a photo eye, etc. Furthermore, the device and/or process can be controlled by the controller 102, a controller engine instance 104, a portion of a controller engine instance, and/or most any suitable combination thereof.

It is to be appreciated that the system 400 can be utilized in a hierarchically structured industrial environment. For example, the devices/processes 404-412 can be hierarchically structured to facilitate management of such devices within the industrial environment 402. The hierarchy can be based at least in part upon the physical location of devices (e.g., a region of a factory can have several defined sub-regions, which in turn can comprise sub-regions), standards associated with industry, such as ISA, S95, ISA S88, and the like, proprietary hierarchy that is provided by an enterprise, or any other suitable hierarchy. For instance, a top portion of the hierarchy may be a plant, and a sub-level of the plant may be programmable logic controllers utilized within the plant, and a sub-level of the programmable logic controllers can be devices controlled by such controllers. It is understood that this is but one example of a hierarchy, and is for illustrative purposes only.

The system 400 can further utilize a manager component 414 that evaluates the industrial environment 402 to ascertain an amount of controller engine instances to generate/spawn in order to handle the load associated with the controller 102. Moreover, the manager component 414 can provide assignments for the generated controller engine instances in light of such evaluation of the industrial environment 402. Particularly, the manager component 414 can receive data associated with the industrial environment 402 (e.g., device data, process data, controller data, controller load data, data related to the industrial environment 402, etc.), wherein the manager component 414 can identify an adequate amount of controller engine instances to generate and/or create based at least in part upon the received data.

It is to be appreciated that the manager component 414 can base the generation of controller engine instances upon a load associated with the controller to which the instances are to execute. However, it is to be understood that the manager component 414 can identify the amount of controller engine instances and/or the assignment of the controller engine instances on most any suitable data related to the industrial environment 402, a pre-defined amount/assignment, a dynamically adjustable amount/assignment, and/or any combination thereof. For instance, the manager component 414 can determine the amount of controller engine instances to spawn based on the type, make, model, brand, etc. of the host controller. In another example, the manager component 414 can ascertain the assignment of the controller engine instance based on a characteristic of a device and/or process (e.g., plant location, security level, functionality, importance, priority, device model, historical data on performance with controller engine instances, etc.). It still another example, the manager component 414 can utilize historic data (e.g., stored in the data store discussed below) in order to fine tune and/or adjust the generation/assignment of controller engine instances. For instance, based on previous trials, a particular brand of controller may only handle three controller engine instances and the manager component 414 can employ such data accordingly for future implementation.

Moreover, the system 400 can include a data store 416 that can store historic data related to controller engine instance generation, historic data related to the industrial environment, historic data related to controller engine instance assignment, controller data, controller engine instance data, assignment data, configuration data related to controllers, controller settings, controller engine instance settings, load data related to a controller, most any suitable data related to a controller and/or a controller engine instance, health data related to a controller, transfer data, distribution data, etc. The data store 416 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 416 of the subject systems and methods is intended to comprise, without being limited to, these and any other suitable types of memory. In addition, it is to be appreciated that the data store 416 can be a server, a database, a hard drive, and the like.

Figure 5:
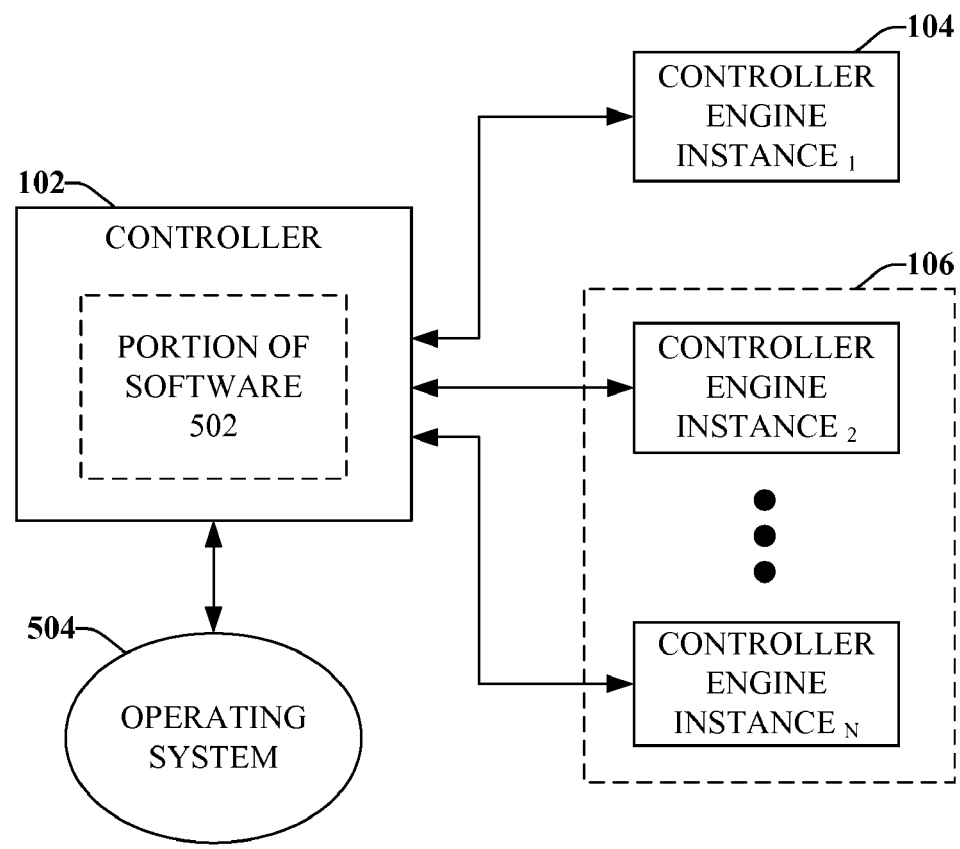
FIG. 5 illustrates a block diagram of an exemplary system that facilitates executing a portion of software within an industrial automation environment with a controller and at least one controller engine instance in real-time.

FIG. 5 illustrates a system 500 that facilitates executing a portion of software within an industrial automation environment with a controller and at least one controller engine instance in real-time. The system 500 can embody the controller engine instance 104 and/or the plurality of controller engine instances 106 that can execute on the controller 102. The controller engine instance 104 can be employed to handle and/or control a portion of a load related to the controller 102. By utilizing a plurality of controller engine instances 106 executing on the controller 102, the controller system (e.g., the controller 102 and/or the plurality of controller engine instances 106) can be dynamic in execution and optimally implemented to utilize the full use of a hardware platform.

The controller 102 can further include a portion of software 502. It is to be appreciated that the portion of software 502 can be embedded with the controller 502 to enable utilization by at least one of controller engine instance 104 and/or the plurality of controller engine instances 106. As stated above, allowing multiple instances of industrial control engines to execute on one physical hardware industrial platform (e.g., the controller 102) can be provided by the claimed subject matter. Moreover, providing such multiple controller engine instances can enable for maximum use of the hardware platform by the portion of software 502. Furthermore, the controller 102 can be more dynamic in execution of the portion of software 502 based at least in part upon the partitioning of the portions of software 502 to the plurality of controller engine instances 106. In addition to the above benefits of implementing multiple instances of controller engines on the controller 102, the controller 102 can further utilize an operating system 504. The operating system 504 can be a third-party portion of software, an off-the-shelf operating system, a real time operating system (OS), and/or most any suitable combination thereof. By utilizing an off-the-shelf operating system and the controller engine instances executing substantially similar to a process, the system 500 can initiate and/or start more than one instance of the controller engine. Furthermore, the plurality of controller engine instances 106 can be capable of executing on hardware designed specifically for a most any suitable control engine.

Figure 6:
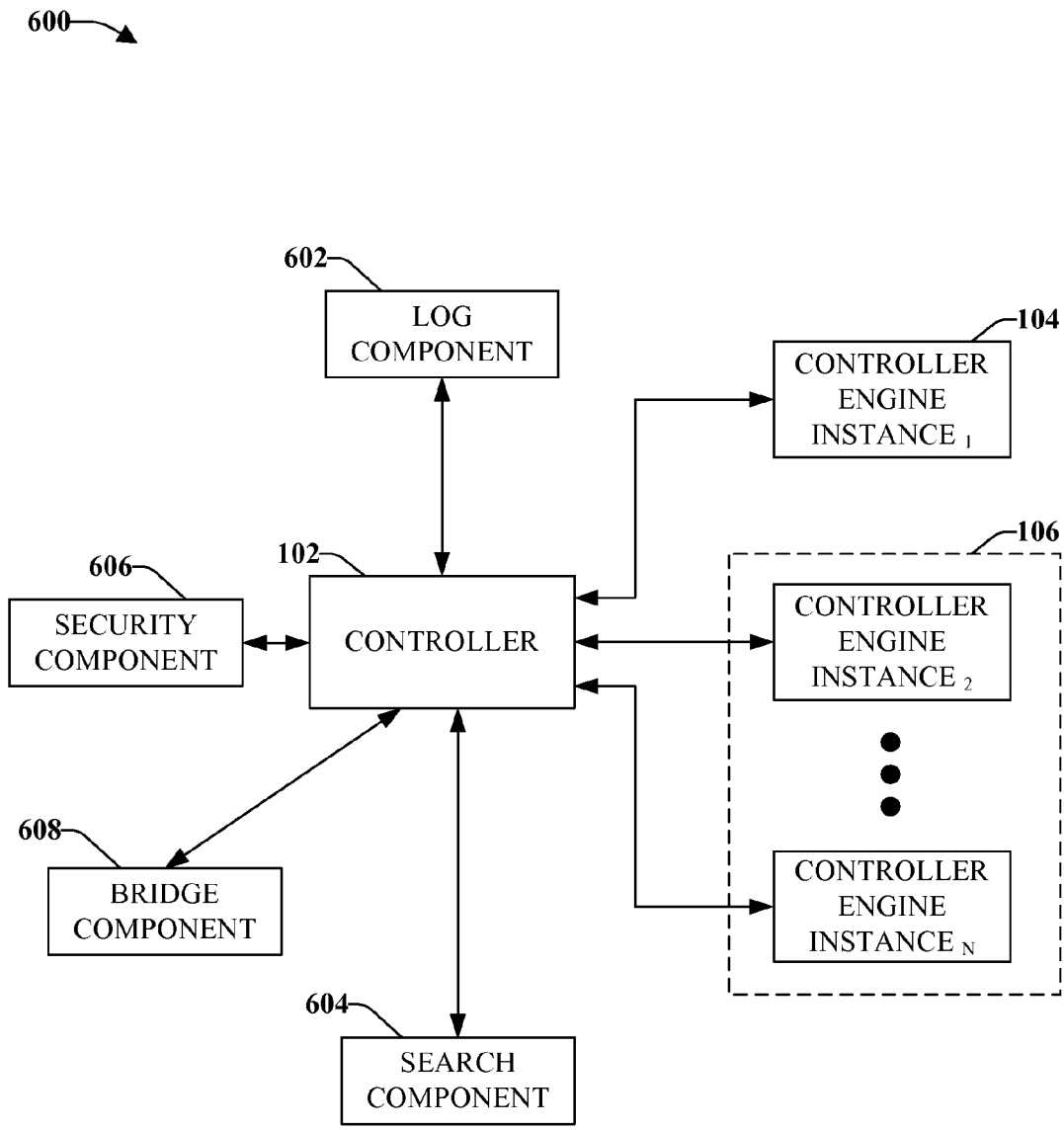
FIG. 6 illustrates a block diagram of an exemplary system that facilitates utilizing multiple controller engine instances with a controller in accordance with the subject innovation.

FIG. 6 illustrates a system 600 that facilitates utilizing multiple controller engine instances with a controller in accordance with the subject innovation. The system 600 can include the controller 102 that can utilized one or more controller engine instance 104, such that most any suitable number of controller engine instances 106 can be executed on the hardware controller 102. By partitioning the controller engine into various instances, the controller engine instances 106 can optimize the potential of the controller 102 by executing portions rather than the conventional one-to-one ratio of a controller engine and controller. In other words, a single controller (e.g., the controller 102) can be optimally enhanced to enable numerous controller engine instances 106 rather than a single controller engine to execute thereupon.

The system 600 can utilize a log component 602 that tracks data associated therewith. In particular, the log component 602 can track and/or monitor data related to controller engine instances, partitions of the controller engine, assignments of the controller engine instances, controller assignments related to controller engine instances, time stamps associated with creation, device data, process data, distribution of controller engine instances, distribution of a controller, assignment data, security data, hierarchy data, and/or most any suitable data related to the controller, controller engine instance, device, process, etc. It is to be appreciated that the log component 602 can be a stand-alone component, incorporated into the controller 102, incorporated into the controller engine instance 104, and/or any combination thereof.

For example, if a user implements the creation of a controller engine instance A, a controller engine instance B, and a controller engine instance C on a controller, the log component 602 can track the user (e.g., via IP address, network address, user name, computer name, etc.), the date and time of creation, the instances created, the assignments related to the instances, the controller partitioned and/or utilized for the instances, etc. The log component 602 can log various aspects related to employing multiple controller engine instances 106 on the controller 102 such as, but not limited to, a portion of code utilized by a controller and/or controller engine instance, configuration settings, security settings, time stamps, dates, user names and/or computer names, etc. Moreover, the log component 602 can store the logged entries in a data store (not shown). It is to be appreciated that the system 600 can enable the creation of a new instance of an engine based on a set of pre-defined parameters. In other words, no user intervention is needed to start a new instance of the engine.

The controller 102 can further utilize a search component 604 that facilitates querying any data associated with the system 600. The search component 604 allows a user and/or any component to query to system 600 in relation to controllers, controller assignment, controller engine instances, controller engine instances assignment, controller assignment origin, controller engine instance origin, controller engine instance data, controller data within the industrial environment, distribution of controller engine instances, processes, devices, applications, portions of code, etc. For instance, a user can query the system 600 utilizing the search component 604 to find a controller engine instance associated with a particular controller within the Localville, Ohio plant. In another example, the search component 604 can allow a developer/user/entity (e.g., a computer, a machine, a corporation, a group, an individual, a controller, etc.) to provide all variable names associated with devices within sector 5, cell 6, and controlled by controller engine instance C executing on controller A. It is to be appreciated that a plurality of searches and/or queries can be implemented by the search component 604 and the above examples are not to be limiting on the claimed subject matter. Moreover, it is to be appreciated that the search component 604 is depicted as a stand-alone component, but the search component 604 can be incorporated into the controller 102, incorporated into the controller engine instance 104, a stand-alone component, and/or any combination thereof.

The controller 102 can further utilize a security component 606 that provides security to the system 600 to ensure data integrity and/or access in connection with the controller 102, the controller engine instance 104, the plurality of controller engine instances 106, and/or most any suitable combination thereof. In particular, the security component 606 can define security, authorization, and/or privileges in accordance with at least one of a pre-defined hierarchy, security level, username, password, access rights, data importance (e.g., more important data correlates with high security clearance), etc. For instance, a particular controller and/or controller engine instance can be a first security level with distinct security authorizations and/or privileges, while a disparate controller and/or controller engine instance can have a second security level with disparate security authorizations and/or privileges. Thus, the security component 606 can provide granular security in relation to controllers, controller engine instances, devices, process association, controller assignment, controller engine instance assignment, distribution of controller engine instances, controller location, controller engine instance location, etc. It is to be appreciated that there can be various levels of security with numerous characteristics associated with each level and that the subject innovation is not limited to the above example. Moreover, the security component 606 provides granular security and/or privileges to the system 600. It is to be appreciated that security component 606 can be a stand-alone component, incorporated into the controller 102, incorporated into the controller engine instance 104, and/or any combination thereof.

The access component 602 can further include a bridge component 608 that facilitates networking within an industrial automation environment. In other words, the bridge component 608 can act as a network bridge. It is to be appreciated that the bridge component 608 can be a stand-alone component, incorporated into the controller 102, incorporated into the controller engine instance 104, and/or any combination thereof. Thus, data carried by disparate networks can be manipulated so that it conforms to a common network. Accordingly, the bridge component 608 can recognize a network protocol associated with received instructions related to the controller 102 and/or controller engine instance 104 and perform operations to convert such data so that it conforms to a pre-defined protocol. Upon such conversion, a mapping can be employed to convert the data so that it conforms to a hierarchically structured data model (rather than data models associated with flat namespaces). The mapping can thereafter provide hierarchically structured data to a requester of such data over a network, wherein the network conforms to the pre-defined protocol. For instance, the first network protocol can be at least one of Fieldbus, Profibus, Hart, Modbus, ASIbus, and Foundation Fieldbus, while the second network protocol can be a Common Industrial Protocol (CIP).

Figure 7:
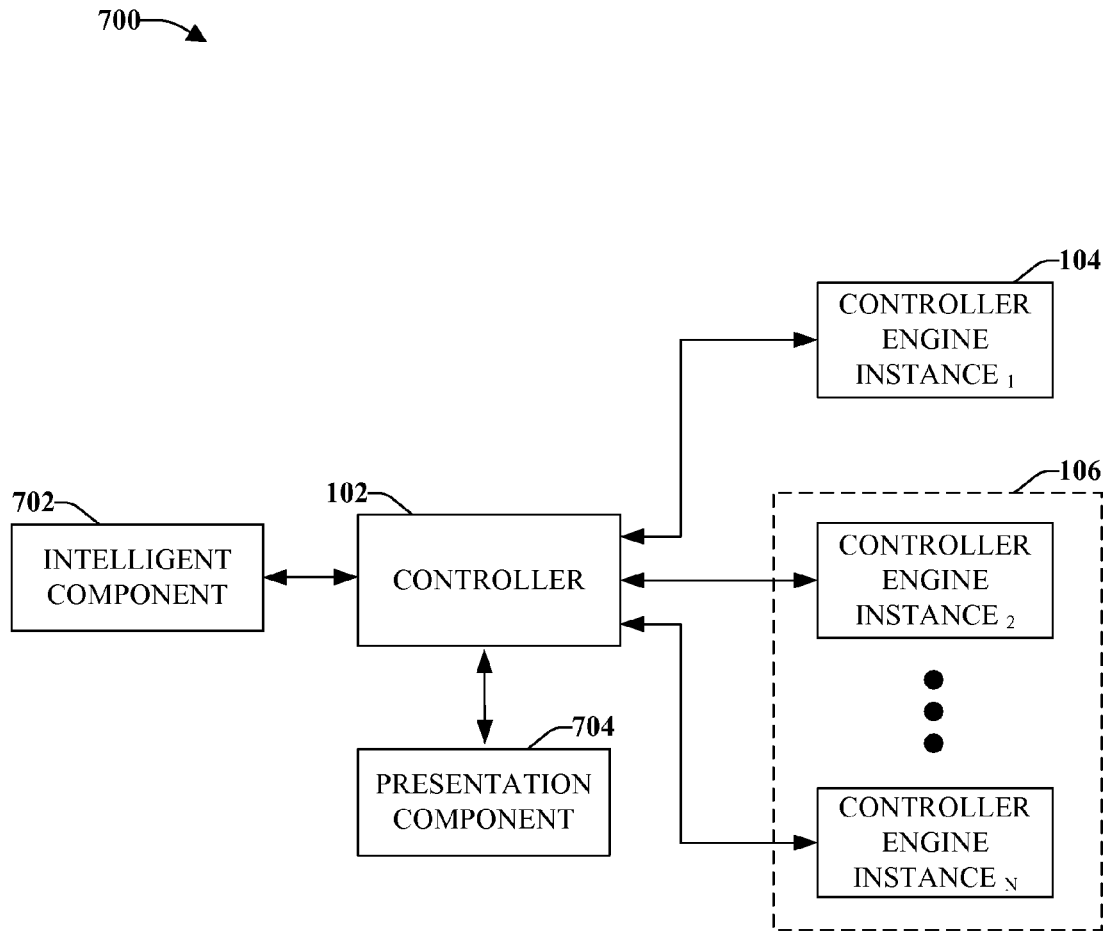
FIG. 7 illustrates a block diagram of an exemplary system that facilitates initiating one or more controller engine instances on a controller utilizing a dynamic distribution of controller resources.

FIG. 7 illustrates a system 700 that employs intelligence to facilitate initiating one or more controller engine instances on a controller utilizing a dynamic distribution of controller resources. The system 700 can include the controller 102, the controller engine instance 104, and a plurality of controller engine instances 106 that can all be substantially similar to respective controllers and instances described in previous figures. The system 700 further includes an intelligent component 702. The intelligent component 702 can be utilized by at least one of the controller 102 or the controller engine instance 104 to facilitate employing multiple controller engine instances on one controller within an industrial automation environment. For example, the intelligent component 702 can infer generation of controller engine instances, controller assignment for a controller engine instance, assignment related to the controller engine instance, number of controller engine instances to employ for a particular controller, number of controller engine instances to employ for an industrial automation environment, assignments, distributions, etc.

It is to be understood that the intelligent component 702 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

The presentation component 704 can provide various types of user interfaces to facilitate interaction between a user and any component coupled to at least one of the controller 102 and/or the controller engine instance 104. As depicted, the presentation component 704 is a separate entity that can be utilized with controller 102. However, it is to be appreciated that the presentation component 704 and/or similar view components can be incorporated into the at least one of the controller 102, the controller engine instance 104, a stand-alone unit, and/or most any suitable combination thereof. The presentation component 704 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to at least one of the controller 102 and/or the controller engine instance 104.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 8:
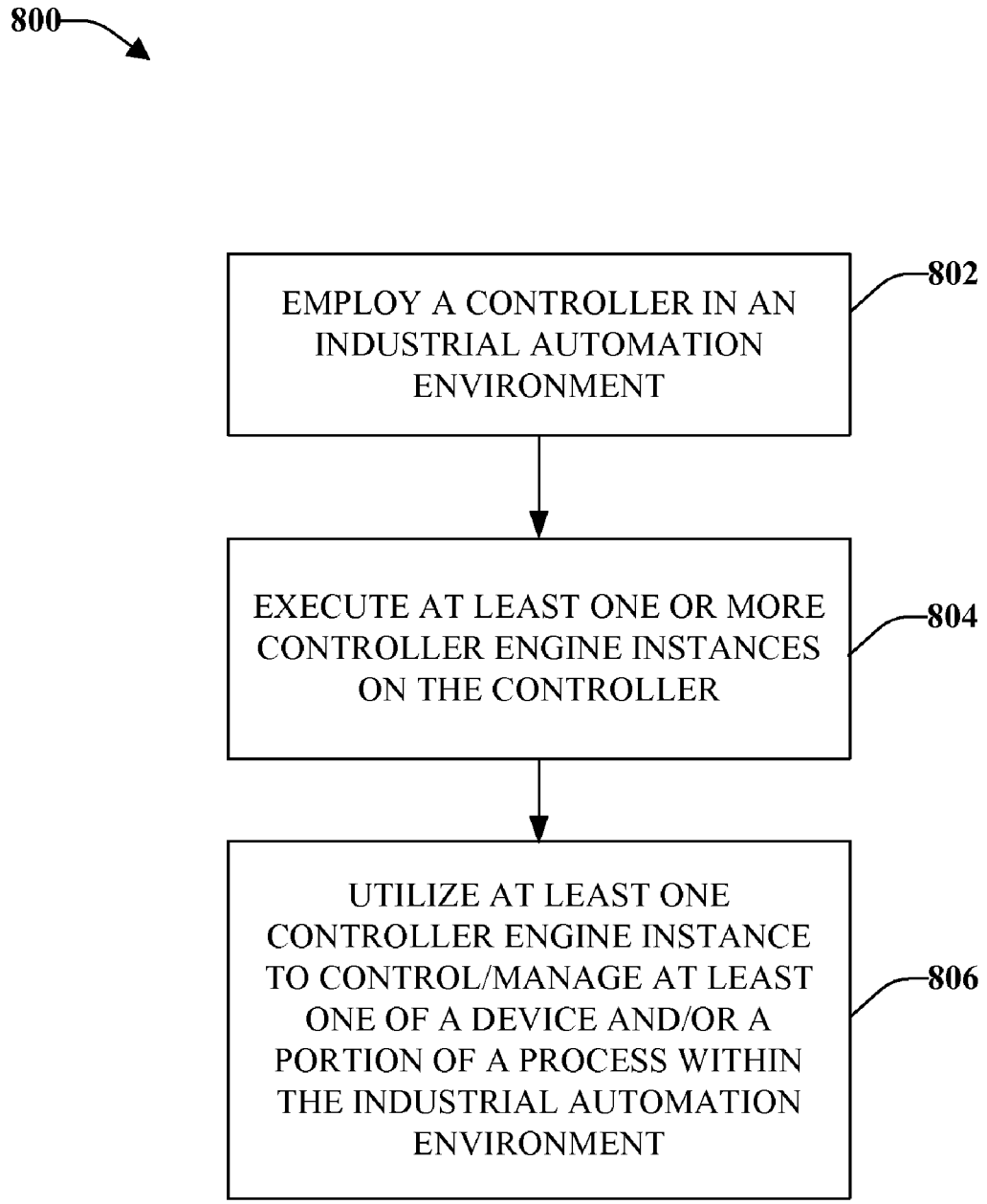
FIG. 8 illustrates an exemplary methodology for executing one or more controller engine instances on a controller within an industrial automation environment.
Figure 9:
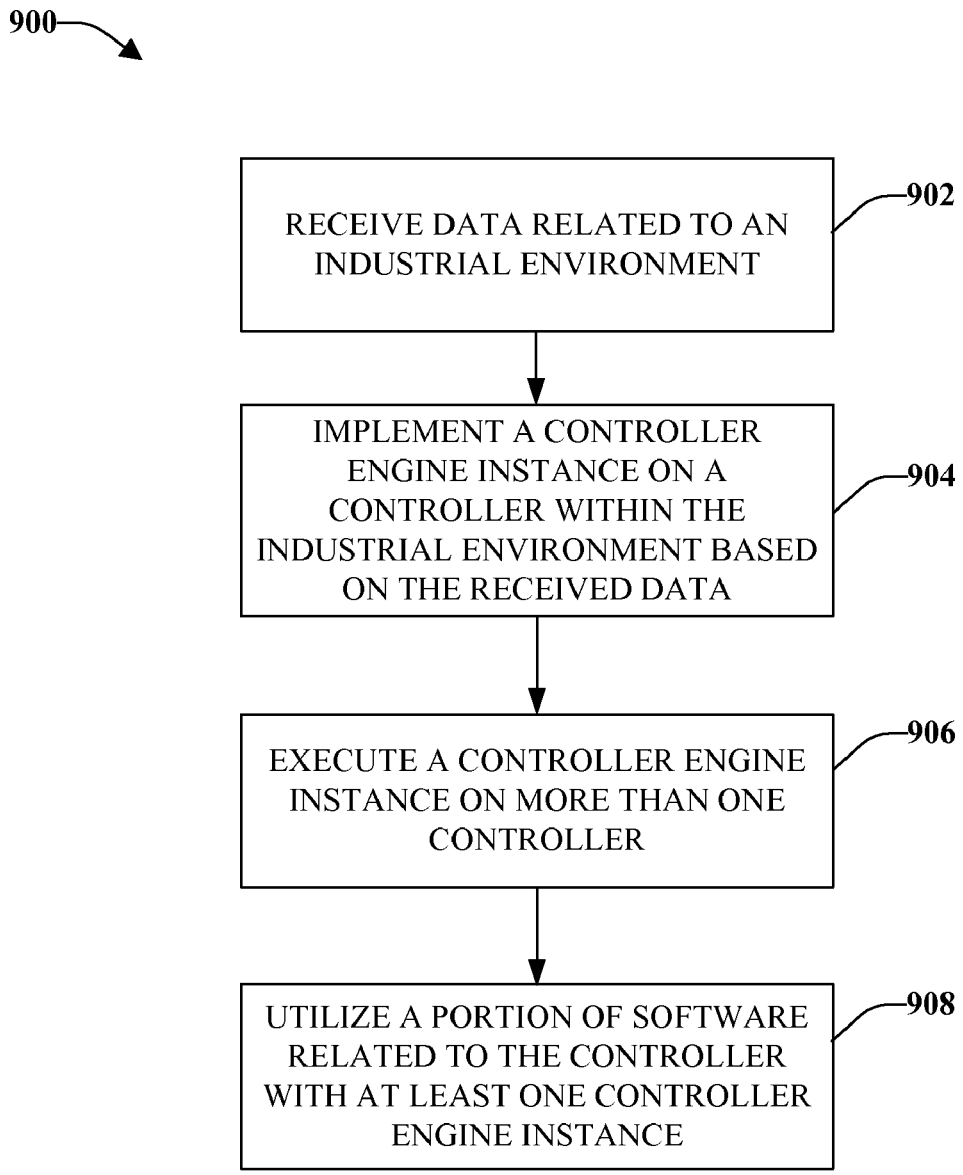
FIG. 9 illustrates an exemplary methodology that facilitates dynamically utilizing a plurality of controller engine instances related to a plurality of controllers.

Referring to FIGS. 8-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology 800 for executing one or more controller engine instances on a controller within an industrial automation environment. At reference numeral 802, a controller with a real time operating system (OS) can be employed in an industrial automation environment. It is to be appreciated that the controller can contain software components and hardware components having inputs and/or outputs that can be utilized in connection with automating an industrial manufacturing device/process within the industrial automation environment. Moreover, it is to be appreciated and understood that the controller can be most any suitable portion of hardware and/or portion of software that receives and/or transmits inputs and/or outputs in order to control at least one of a device or a portion of a process. It is to be noted that a controller (e.g., a programmable logic controller (PLC), etc.) can be a dedicated piece of hardware that is self contained or in the case of a "soft PLC" a piece of software that runs on a computer and provides PLC-like control.

At reference numeral 804, at least one or more controller engine instances can be executed on the controller within the industrial automation environment. The controller can utilize most any suitable number of controller engine instances such as controller engine instance $_1$, controller engine instance $_2$, to controller engine instance $_N$, where N is a positive integer. Furthermore, the claimed subject matter implements a controller engine in a substantially similar manner to a process implemented on a hardware controller in the fact that multiple controller engines (e.g., controller engine instance) can execute on the hardware controller (e.g., multiple processes can execute on a controller). It is to be appreciated that the one or more controller engine instances can be executed without user intervention (e.g., in an automatic and seamless manner without human assistance). At reference numeral 806, at least one controller engine instance can be utilized to control and/or manage at least one of a device or a portion of a process within the industrial automation environment. In other words, the controller can implement a plurality of controller engine instances, wherein each controller engine instance can handle controlling a device and/or portion of a process within an industrial automation environment.

In one example, an industrial automation environment can include a device controller such that the device controller can execute at least two or more controller engine instances that can facilitate controlling/managing the devices associated to the device controller. Conventionally, the device controller executes a single controller engine that provides control/management. However, with the claimed subject matter, multiple controller engine instances can be executed on the device controller to enable each controller engine instance to control/manage/handle a portion of the device controller's responsibilities and/or load.

FIG. 9 illustrates a methodology 900 that facilitates dynamically utilizing a plurality of controller engine instances related to a plurality of controllers. At reference numeral 902, data related to an industrial environment can be received. The industrial environment (e.g., an industrial environment, an automation environment, an environment, an automation industry, etc.) can employ a hierarchical representation of devices and/or processes. The hierarchy can be based at least in part upon the physical location of devices/processes (e.g., a region of a factory can have several defined sub-regions, which in turn can comprise sub-regions), standards associated with industry, such as ISA, S95, ISA S88, and the like, proprietary hierarchy that is provided by an enterprise, or any other suitable hierarchy. At reference numeral 904, a controller engine instance can be implemented on a controller within the industrial environment based at least in part upon the received data. The industrial environment can be evaluated to ascertain an amount of controller engine instances to generate/spawn in order to handle the load associated with the controller. Moreover, assignments can be provided for the generated controller engine instances in light of such evaluation of the industrial environment. Particularly, data associated with the industrial environment (e.g., device data, process data, controller data, controller load data, data related to the industrial environment 402, etc.) can be received in order to identify an adequate amount of controller engine instances to generate and/or create.

At reference numeral 906, a controller engine instance can be executed on more than one controller. A portion of the controller engine instance that is shared and/or distributed to more than one controller can be referred to as a distributed controller engine instance. Specifically, the distributed controller engine instance can be executed on at least one of a portion of a first controller and a portion of a second controller, where there can be most any suitable number of controllers. Moreover, the controller engine instance can be hosted/executed on a first controller then be seamlessly handed-off to a disparate controller. It is to be appreciated that in a distributed controller engine instance, at least two controllers can simultaneously and concurrently host/execute such instance.

At reference numeral 908, a portion of software related to the controller can be utilized with at least one controller engine instance. For instance, the portion of software can be embedded on the controller, wherein the controller engine instance can dynamically execute such embedded software on the physical industrial control platform (e.g., the controller within the industrial environment). Moreover, it is to be appreciated that the controller can utilize most any suitable operating system such that the operating system is off-the-shelf, a third-party operating system, a real time operating system (OS), and/or most any suitable operating system related to a machine, computer, etc.

Figure 10:
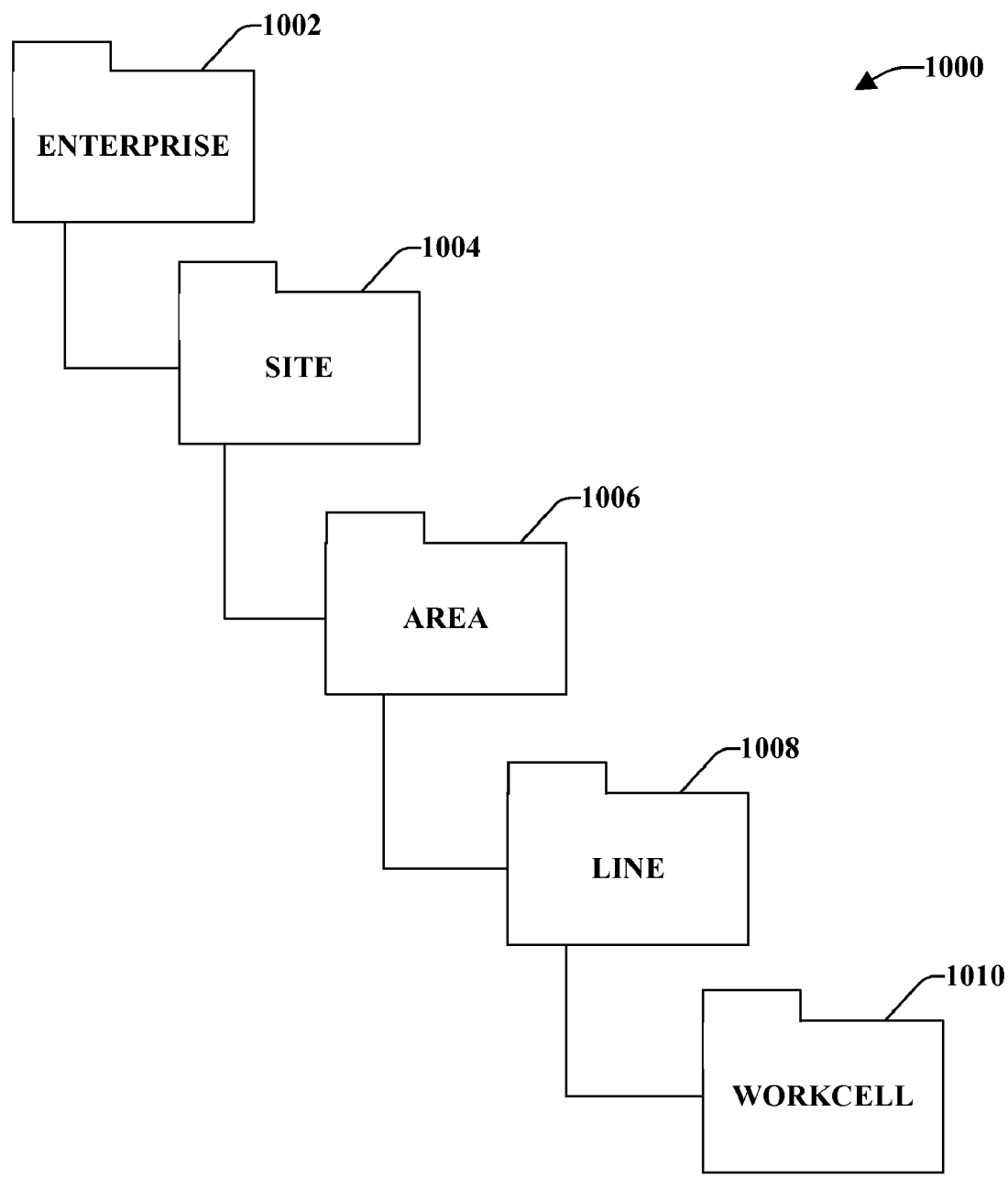
FIG. 10 illustrates a block diagram of an exemplary data structure that represents a hierarchical structure of an industrial automation system.

Referring now to FIG. 10, an exemplary hierarchical structure 1000 which can be utilized in connection with the hierarchically structured data model (e.g., hierarchical representation of assets) alluded to herein is illustrated. For example, the data model can facilitate nested structures, thereby mitigating deficiencies associated with data models that employ flat namespaces. The structure 1000 includes an enterprise level 1002, where a particular enterprise can be represented within data structured in accordance with a hierarchical data model. Beneath the enterprise level 1002 can be a site level 1004, so that a particular factory (site) within an enterprise can be represented within a data packet. Beneath the site level 1004 an area level 1006 can exist, which specifies an area within the factory that relates to the data. A line level 1008 can lie beneath the area level 1006, wherein the line level 1008 is indicative of a line associated with particular data. Beneath the line level 1008 a workcell level 1010 can exist, thereby indicating a workcell associated with the data. Utilizing a nested, hierarchical data model, PLCs can become more aware of data associated therewith. Furthermore, the hierarchy 1000 can be customized by an owner of such hierarchy. For instance, more granular objects/levels can be defined within the hierarchy 1000 in relation to the various assets associated therewith.

Figure 11:
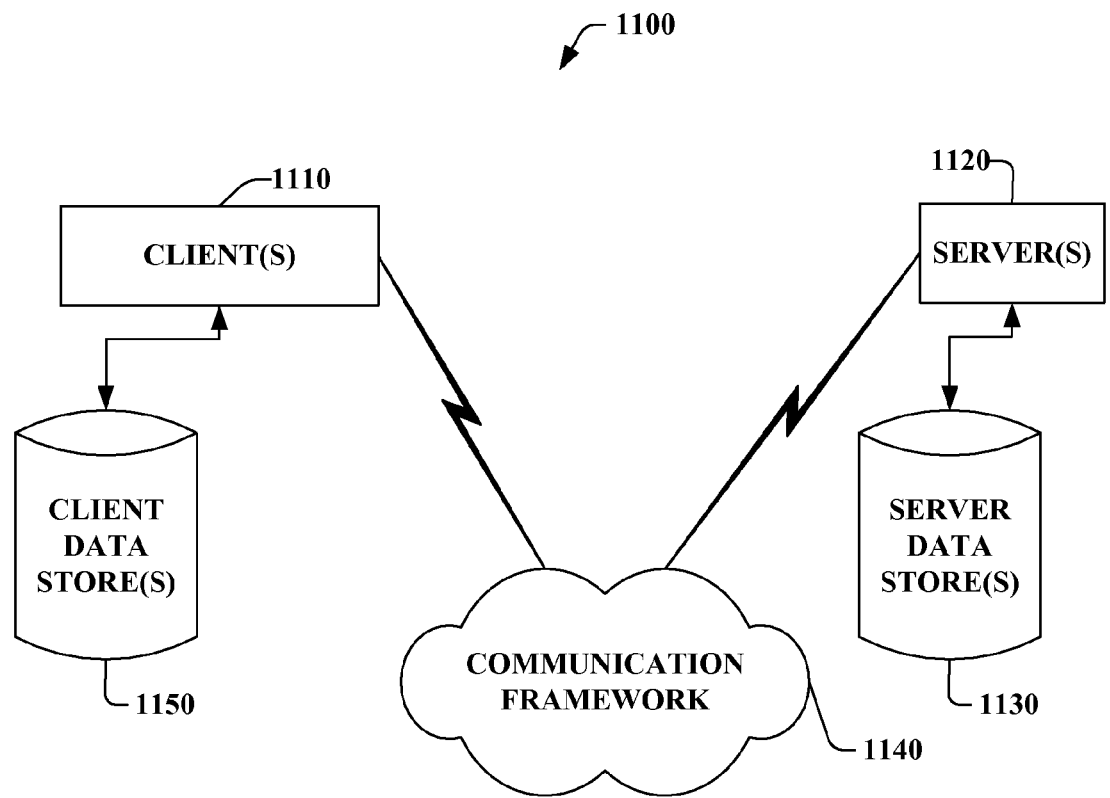
FIG. 11 is an exemplary computing environment that can be utilized in connection with the claimed subject matter.
Figure 12:
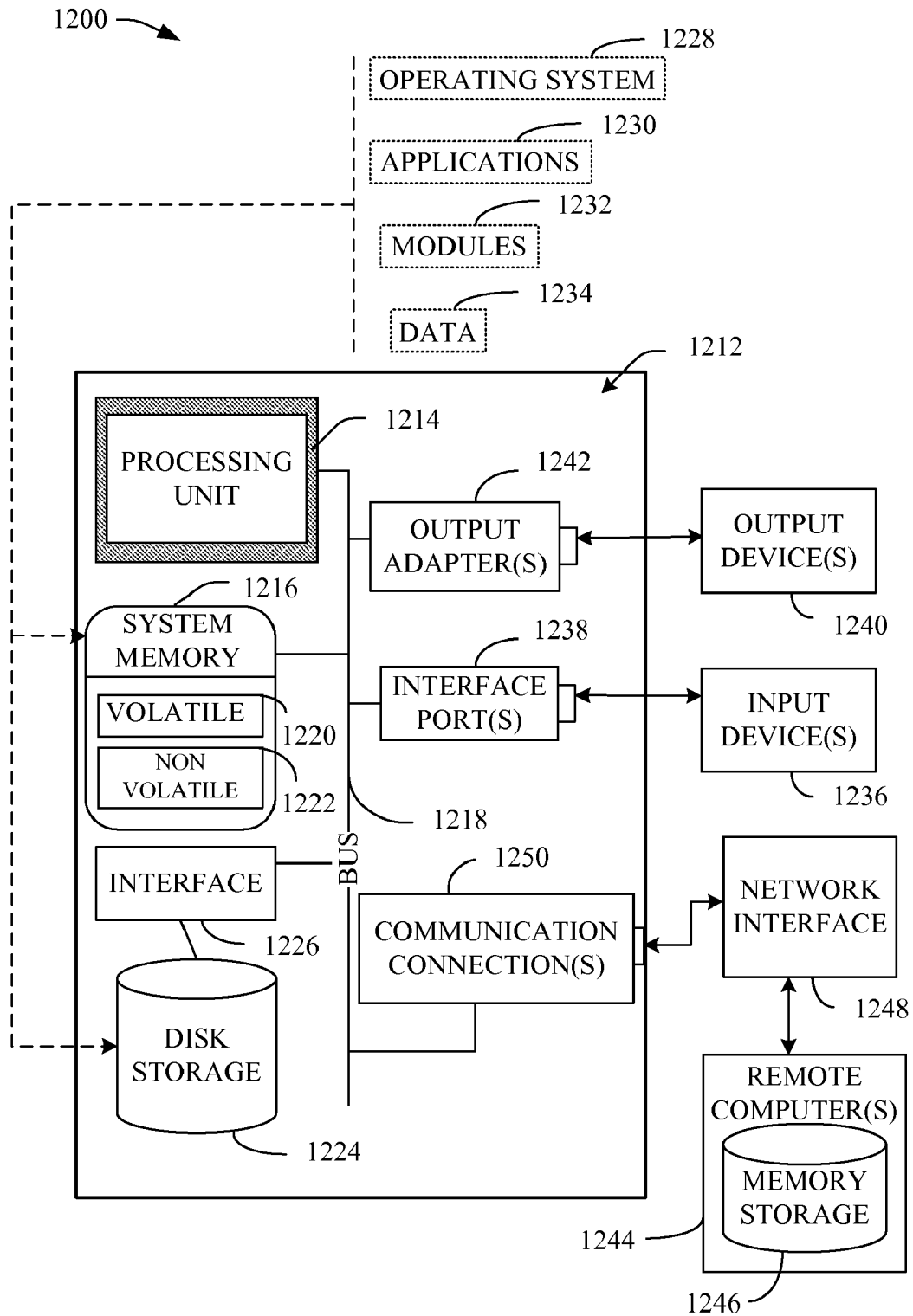
FIG. 12 is an exemplary networking environment that can be utilized in connection with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that optimizes a controller within an industrial automation environment, comprising:
    at least one processor of the controller that executes computer readable components in a real time operating system in the industrial automation environment, the components including:
        a manager component that dynamically determines a number of controller engine instances to be generated, without user intervention, based in part on an evaluation of the industrial automation environment and provides dynamic assignments for each of the generated controller engine instances, the number of controller engine instances is greater than one; and
        the generated controller engine instances that automatically execute on the controller independent of user intervention to enable dynamic control related to at least one of a device or a portion of a process within the industrial automation environment based in part on the assignments.

2. The system of claim 1, further comprising a distributed controller engine instance that concurrently executes on a portion of the controller and a disparate controller within the industrial automation environment.

3. The system of claim 1, further comprising a disparate controller associated with the industrial automation environment, the disparate controller includes two or more disparate controller engine instances executing thereon.

4. The system of claim 1, further comprising a portion of at least one of the generated controller engine instances that is seamlessly transferred to execute on a disparate controller.

5. The system of claim 4, wherein the portion of the at least one of the generated controller engine instances is transferred, without user intervention, based upon at least one of a deterioration of the controller, a problematic controller, a circumstance related to the controller, a restructuring, an upgrade, a security issue, an error related to the industrial automation environment, a firmware upgrade, a dependability characteristic of the controller, or a controller health.

6. The system of claim 1, wherein the manager component determines the number of controller engine instances to generate based at least in part upon a load related to the controller.

7. The system of claim 1, the manager component distributes controller engine instance assignment in real-time based upon the evaluation of the industrial automation environment.

8. The system of claim 1, the manager component evaluates at least one of device data, process data, controller data, controller load data, or data related to the industrial automation environment.

9. The system of claim 1, the manager component provides at least one of an assignment of the controller engine instance or a number of controller engine instances to generate based at least in part upon at least one of a pre-defined amount, a pre-defined assignment, a dynamically adjustable amount, a dynamically adjustable assignment, a type of controller, a make of the controller, a model of the controller, a brand of the controller, a characteristic of a device or process, a device or process security level, a device or process functionality, a device or process importance, a device or process priority, historical data related to controller performance, or historical data.

10. The system of claim 1, at least one of the device or the portion of the process are hierarchically represented based at least in pat upon a physical location within the industrial automation environment.

11. The system of claim 10, the hierarchical representation of devices is based at least in part upon an industry standard, including, at least one of ISA, S95, or ISA S88.

12. The system of claim 11, the hierarchical representation is based at least in part upon a proprietary hierarchy that is provided by an enterprise.

13. The system of claim 1, further comprising a portion of software embedded on the controller to enable dynamic execution by the generated of controller engine instances.

14. The system of claim 1, the real time operating system is at least one of a third-party portion of software, an off-the-shelf operating system, or a combination thereof.

15. The system of claim 1, further comprising a security component that defines at least one of a security level, an authorization, or a privilege that corresponds to at least one of the controller or at least one of the generated controller engine instances.

16. The system of claim 1, further comprising a search component that facilitates querying data associated with at least one of the controller, at least one of the generated controller engine instances, or data related to the industrial automation environment.

17. The system of claim 1, further comprising a log component that tracks data related to at least one of the at least one of the generated controller engine instances, or an assignment of at least one of the generated controller engine instances.

18. The system of claim 1, further comprising a bridge component that provides a first network protocol utilized to carry data from at least one of the controller or at least one of the generated controller engine instances and configures the data for transmittal over a second network protocol by performing a mapping.

19. The system of claim 18, the bridge component bridges multiple communication networks.

20. The system of claim 18, the first network protocol is at least one of Fieldbus, Profibus, Hart, Modbus, ASI-bus, or Foundation Fieldbus.

21. The system of claim 20, the second network protocol is Common Industrial Protocol (CIP).

22. A method that facilitates utilizing a controller within an industrial environment, comprising:
  employing at least one processor that executes computer executable instructions in a real time operating system in the industrial environment to perform the following acts:
    generating two or more controller engine instances based in part on an evaluation of the industrial environment, without user intervention;
    dynamically assigning at least one of a device or a portion of a process within the industrial environment for each of the two or more controller engine instances;
    automatically executing the two or more controller engine instances on the controller without user intervention;
    at least one of transferring, handing off, or sharing, a portion of at least one of the two or more controller engine instances to a disparate controller based in part on a specified event; and
    utilizing at least one controller engine instance to manage the assigned at least one of device or portion of a process within the industrial environment.

23. The method of claim 22, further comprising:
receiving data related to an industrial environment;
evaluating the received data; and
implementing a controller engine instance on the controller within the industrial environment based on the evaluation of the received data.

24. The method of claim 22, further comprising executing the controller engine instance on more than one controller.

25. The method of claim 22, wherein the generating includes generating two or more controller engine instances, without user intervention, based in part on at least one of a load associated with the controller, a pre-defined assignment, a dynamically adjustable assignment, type of the controller, make of the controller, model of the controller, brand of the controller or historical data.

26. The method of claim 22, wherein the at least one of transferring, handing off, or sharing includes at least one of transferring, handing off, or sharing a portion of at least one of the two or more controller engine instances to a disparate controller is based upon at least one of a deterioration of the controller, a problem related to the controller, a circumstance related to the controller, a restructuring, an upgrade, a security issue, an error related to the industrial environment, a firmware upgrade, a dependability characteristic of the controller, or health of the controller.

27. The method of claim 22, further comprising embedding a portion of software embedded on the controller to enable dynamic execution by at least one controller engine instance.

28. The method of claim 22, wherein the employing includes employing at least one processor that executes computer executable instructions in at least one of a third-party portion of software, or an off-the-shelf operating system.

29. The method of claim 22, further comprising utilizing a portion of software related to the controller with at least one of the two or more controller engine instances.

30. A computer-implemented system that facilitates optimizing a controller within an industrial automation environment, comprising:
  at least one processor that executes computer executable instructions in a real time operating system to implement components comprising:
    means for controlling at least a part of the industrial automation environment;
    means for receiving data related to at least one of the means for controlling or the industrial automation environment;
    means for generating two or more controller engine instances based in part on an evaluation of the industrial automation environment, without user intervention, wherein at least one of a device or a portion of a process within the industrial automation environment is dynamically assigned to each of the two or more controller engine instances;

means for automatically executing the two or more controller engine instances on the controller; and means for utilizing at least one of the two or more controller engine instance to manage the at least one of the device or the portion of the process within the industrial automation environment.

* * * * *